United States Patent Office 3,312,860
Patented Apr. 4, 1967

3,312,860
CONDENSER DISCHARGE USING SILICON CONTROLLED RECTIFIER CONTROL MEANS
Theodor F. Sturm, Altadena, Calif., assignor, by mesne assignments, to Straza Industries, El Cajon, Calif., a corporation of California
Filed Sept. 27, 1963, Ser. No. 312,124
2 Claims. (Cl. 315—223)

This invention relates to an ignition system for internal combustion engines, and to a power supply incorporated in such ignition system.

An object of the present invention is to provide an efficient, practical and economical ignition system which is not limited relative to power capability or spark rate, and which delivers an average power proportional to the spark rate or r.p.m. of the engine.

Another object is to provide an improved ignition system which increases the gas mileage of the automobile, and which minimizes wear at the breaker points, fouling of the spark plugs, etc.

A further object is to provide an ignition system incorporating a silicon controlled rectifier, and further incorporating means to insure that such rectifier may not be triggered in a manner creating a short circuit and improper operation of the system.

A further object of the invention is to provide a highly economical ignition system incorporating a single-transistor power supply.

Another object is to provide a transistorized ignition system which may be constructed as a very compact and lightweight unit, and which is characterized by the absence of separate heat-dissipating casings or heat sinks.

A further object is to provide a transistorized ignition system which is operative with the existing coils and distributors in conventional automobiles, whereby the cost of substituting the present system for an existing system is minimized.

Figure 1:
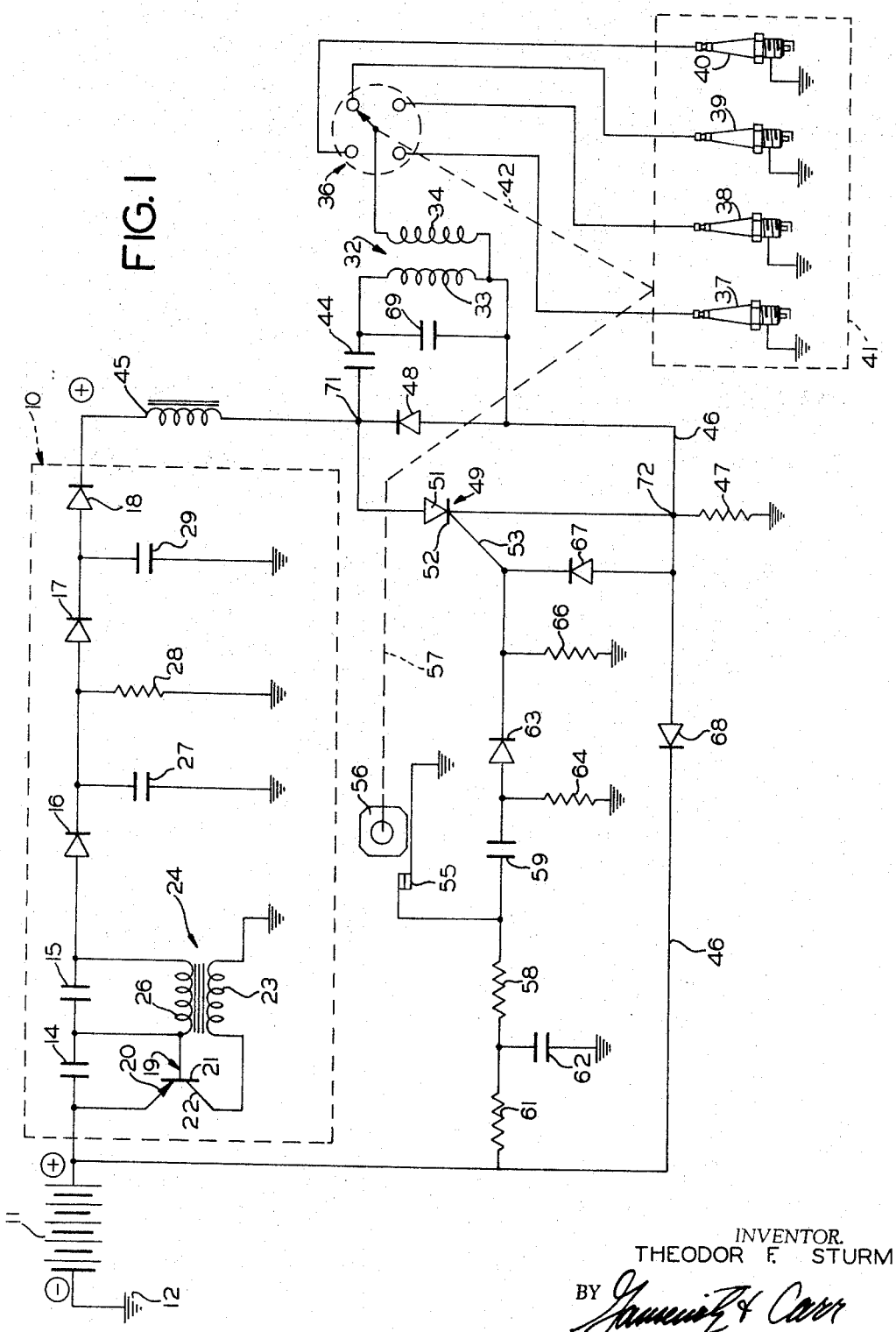
Figure 2:
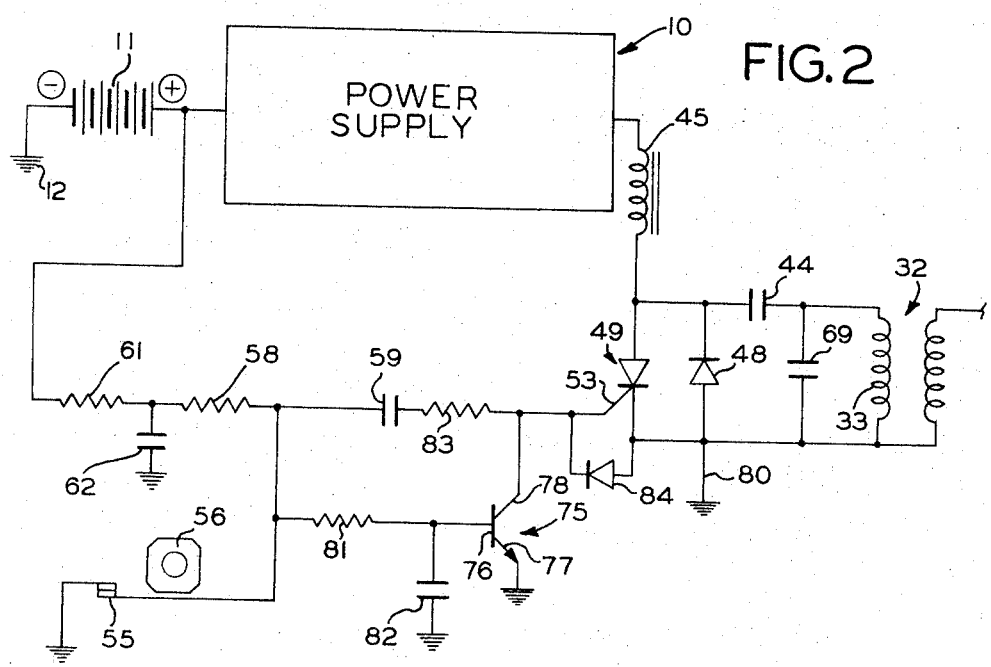
Figure 3:
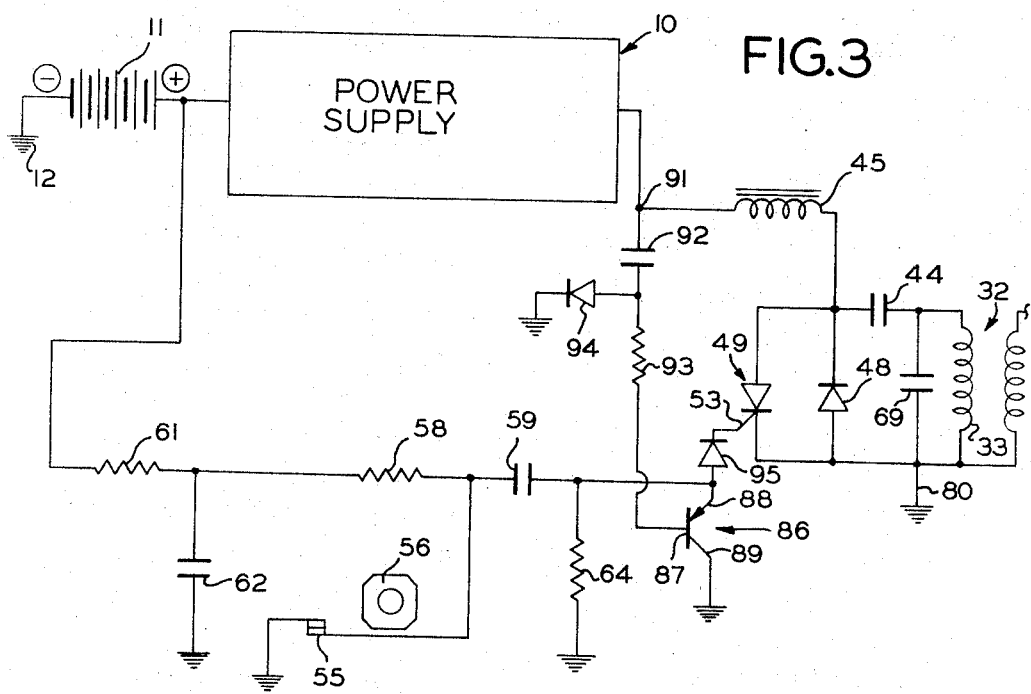

These and other objects will become apparent from the following detailed description taken in connection with the accompanying drawings in which:

FIGURE 1 is a wiring diagram indicating schematically a first embodiment of the ignition system; and FIGURES 2 and 3 are wiring diagrams showing, in schematic form, second and third embodiments of the invention.

Referring to the embodiment of FIGURE 1, there will first be described the power supply which is utilized in all of the illustrated embodiments of the invention. Such power supply is enclosed by a dashed-line box indicated at 10, and is connected to the positive terminal of the automobile battery 11. The negative terminal of the battery is grounded, as indicated at 12. It is to be understood that, by suitably modifying the circuit, the power supply may be fed from the negative battery terminal instead of the positive terminal.

Connected in series-circuit relationship between the input and output terminals of the power supply are first and second capacitors 14 and 15, and first, second and third diodes 16–18. A switching transistor 19 (shown as being of the PNP type) is provided, having its emitter 20 connected to the power supply input, and having its base 21 connected to the junction between capacitors 14 and 15. The collector 22 of transistor 19 is connected to ground through the primary 23 of a step-up transformer 24. The secondary 26 of the transformer is connected between base 21 and the junction between capacitor 15 and diode 16, that is to say is connected in parallel with capacitor 15.

It is an important feature of the power supply 10 that transformer 24 may be of an economical type, for example having a powdered iron core, and including only four terminals. Another highly important feature of the power supply is that only a single transistor is employed. The utilization of only a single transistor, with a single relatively small and economical transformer, result in a power supply characterized by a low parts cost and by a low cost of assembly. Furthermore, the power supply may be incorporated in the same package as the remainder of the ignition system, there being no necessity for a separate heat-dissipating casing as is conventional in various transistorized ignition systems known to the art.

A capacitor 27 and resistor 28 are connected in parallel with each other between ground and the lead which extends between diodes 16 and 17. Capacitor 27 has a relatively low value, as does resistor 28, in order that capacitor 27 may charge and discharge rapidly. Capacitor 27 will be termed the "oscillator" capacitor since, in the absence of such capacitor, it would be impractical or impossible to maintain oscillations with the single transistor.

Connected between ground and the junction between diodes 17 and 18 is a second capacitor, which is denoted 29. Such capacitor will be termed the "storage" or "reservoir" capacitor, having a value which is a high multiple of the value of capacitor 27. The value of capacitor 29 is also a high multiple of the value of the spark or firing capacitor to be described subsequently.

*Operation of power supply 10*

Relative to the operation of the power supply circuit 10, let it first be assumed that the various capacitors are not yet charged. When the battery power is applied, by turning on the ignition switch, a current will flow through emitter 20 and base 21 to the secondary winding 26 of transformer 24, and thence through diode 16 to charge the oscillator capacitor 27. Current will also flow through diode 17 to charge the storage or reservoir capacitor 29.

The above-indicated current flow between emitter 20 and base 21 will place transistor 19 in conduction, so that current can flow from the power supply input through emitter 20, collector 22, and transformer primary 23 to ground. The voltage thus present in primary 23 is induced, in stepped-up form, to secondary 26, so that a much greater voltage is available to continue the charging of capacitors 27 and 29.

The manner of winding of transformer 24 is such that the right side of secondary 26 will be positive when the left side of primary 23 is positive. It follows that the voltage supplied by secondary 26 adds to the voltage supplied by the battery 11 to produce the capacitor-charging current. The strong current flowing through secondary 26 supports a much stronger current in primary 23. The result is that the current flowing in primary 23 progressively increases. However, the current flowing in the secondary 26 eventually decreases due to the completion of charging of capacitors 27 and 29. The secondary current, which is the base current in transistor 19, then becomes insufficiently strong to maintain the transistor in conduction, so that the transistor switches itself off and prevents further charging of the capacitors.

A restoring action then takes place, being caused in part by the energy stored in capacitor 15 and transformer 24. The relationship between capacitor 15, transformer 24 and other circuit components is such that an oscillatory discharge action results (the capacitor discharging through secondary 26), whereby the right terminal of the capacitor 15 (junction between capacitor 15 and diode 16) swings to negative polarity and then returns again to positive polarity. By the time such positive polarity is again achieved, the capacitor 27 will have discharged sufficiently to permit flow of additional charging current through diode 16 into such capacitor 27. The path for such additional charging current into capacitor 27 is through the emitter 20 and base 21, as described above, which means that such additional charging current will again place the transistor 19 in conduction. The entire cycle will then repeat and will maintain the storage or reservoir capacitor 29 in substantially fully-charged condition at all times.

The resistor 28 serves to permit the necessary rapid discharge of oscillator capacitor 27, the discharge circuit being through such resistors and through ground. The various circuit parameters are so selected that the capacitor 27 will discharge sufficiently rapidly to permit the necessary additional flow of current through transistor base 21 during the above described oscillatory voltage swing at the junction between capacitor 15 and diode 16.

The duration of each period of conduction of transistor 19 is determined by the load on the power supply 10, which in turn depends primarily upon the power requirements of the ignition system (including the r.p.m. of the engine). It will be understood that if energy is rapidly draining out of storage capacitor 29 it will take a much longer period of time to effect complete charging of capacitors 27 and 29, so that the transistor 19 will remain in conduction longer than would be the case if relatively little energy were being drained out of capacitor 29. The duration of the restorative cycle, between conductive periods of transistor 19, is determined primarily by the magnitude of capacitor 15.

The capacitor 14 protects transistor 19 from excessive reverse voltages resulting from leakage in diodes 16 or 17. Furthermore, the capacitor 14 permits the transistor to cut off despite the presence of leakage current in the transistor.

Diode 16 effects rectification of the current during the period when transistor 19 is in condition, whereas diode 17 permits charging of capacitor 27 without simultaneously resulting in discharge of capacitor 29. Diode 18 insures that no energy will be returned through the power-supply output terminal to storage capacitor 29.

Instead of connecting the transistor 19 in common emitter relationship, as indicated in the drawing, it may be connected in common collector relationship. Furthermore, it is within the scope of the invention to provide an auxiliary transformer winding in order to compensate for any deficiencies in the voltage supplied from the battery to the power supply 10. Although the output of the power supply is shown as being positive, it is possible but less practical to make such output negative.

*Description of the charge and discharge circuits for the spark-supplying capacitor*

The conventional step-up ignition or induction coil for an automobile (or other internal combustion) engine is indicated at 32, having a primary 33 and secondary 34. One terminal of the secondary may be connected to the corresponding terminal of the primary, the remaining secondary terminal being connected to the conventional distributor indicated at 36. Such distributor is, in turn, connected through suitable leads to the spark plugs 37–40, so that current from the distributor passes through the respective spark plugs to ground. The internal combustion engine with which the spark plugs are associated is indicated by the box 41. The conventional drive from the engine to the distributor is indicated by the dashed line 42.

The previously-mentioned spark or firing capacitor is indicated at 44. The charging circuit for such capacitor includes the output terminal (positive polarity) of power supply 10, a choke or inductor 45, the capacitor 44, primary winding 33 of transformer 32, and a lead 46 which conducts current to ground and also back to the positive terminal of battery 11. Stated otherwise, some of the current from primary 33 flows to ground through a resistor 47 which is connected to lead 46, while other current from primary 33 flows through a diode back to the positive battery terminal (the power-supply input). The value of resistor 47 is such that, during most periods of operation, the greater part of the charging current for capacitor 44 normally flows back to the battery, thereby conserving energy.

The discharge circuit, through which the firing or spark capacitor 44 may discharge in an oscillatory manner, includes a diode 48 and a silicon controlled rectifier (SCR) 49. The term "SCR" includes, in the specification and claims, an equivalent three-terminal electronic switch including a control terminal and a pair of current-carrying terminals. The diode 48 is connected between lead 46 and the left terminal of capacitor 44, being so arranged that conduction may only be effected in a direction toward the choke 45. The SCR 49 is connected between the same two points but in a manner such that conduction may only be effected through the SCR from capacitor 44 to lead 46. Thus, the SCR and diode 48 are connected in parallel or shunt with each other, but are reverse oriented relative to each other. The SCR has an anode 51, a cathode 52, and a gate or triggering-terminal 53.

Let it first be assumed that the spark capacitor 44 is fully discharged, and that SCR 49 is open-circuit condition. Current from the power supply 10 through choke 45 will then charge capacitor 44, the shape of the current wave being substantially a part of a sine wave, whereas the wave shape of the voltage across capacitor 44 will be similar to a negative cosine wave. The voltage across capacitor 44 starts from zero and rises to approximately twice the voltage of power supply 10. Thus, if the power supply voltage is (for example) approximately 150 volts, the maximum voltage across capacitor 44 will approach 300 volts.

The choke or inductor 45 permits charging of spark capacitor 44 to the indicated high-voltage value. Furthermore, the losses are greatly minimized in comparison to those which would occur if a resistor were employed in place of the choke.

The value of the charging choke 45 is so selected that (taking into account the inductance of transformer primary 33) the resonant circuit formed by capacitor 44 and choke 45 will have a resonant frequency higher than a predetermined value. The resonant frequency is such that the time interval required to complete one half cycle of the voltage wave in the resonant circuit (formed by elements 44 and 45) will be less than the minimum interval between two successive sparks in the engine. This insures that the capacitor 44 will be fully charged when it is desired to discharge the same and thereby generate a spark in one of the spark plugs 37–40.

After the spark capacitor 44 is fully charged as indicated, the SCR 49 is triggered (as will be described in detail subsequently) to create a very low-impedance path through the SCR from capacitor 44 to lead 46. Spark capacitor 44 is thus placed in shunt with primary 33, permitting current to flow in a counterclockwise direction from the left terminal of capacitor 44 (which has a positive polarity when the capacitor is charged as indicated) through SCR 49 to lead 46, thence upwardly through primary 33 back to the right terminal of capacitor 44. Because of the inductance of transformer 32, the current will continue until the right side of capacitor 44 becomes charged positively and the left side negatively.

After capacitor 44 is thus charged with reverse polarity, a restoring or reverse current flow occurs, in a clockwise direction. The path of the restoring current is downwardly through primary 33 to lead 46, thence upwardly through diode 48 to the capacitor 44. Such flow of restoring current also operates to effect extinguishment of the SCR 49, since SCR 49 will at this time be slightly negatively biased between its anode 51 and cathode 52. Various means for insuring that the SCR extinguishes are described subsequently, and from important features of the present invention.

The voltage generated in transformer primary 33 due to the indicated current flows therethrough will induce an extremely high voltage into the secondary, such voltage being on the order of one hundred times the primary voltage. Such voltage is supplied through distributor 36 to the respective spark plugs 37–40. It is to be noted that the present system only supplies to each spark plug the amount of energy required for adequate sparking in the associated cylinder head, which energy varies with pressure in the cylinder. The system is therefore highly efficient.

*Means for triggering SCR 49, and preventing false triggering thereof*

The elements which are employed for effecting triggering of SCR 49, and for preventing false or destructive triggering thereof, will next be described. In order to trigger the SCR 49, a positive trigger voltage pulse is applied to gate 53. This pulse may be generated in various ways, including the use of a magnetic generator or an electro-optical generator. In the present system, in order to make use of existing equipment in the automobile, the conventional circuit breaker or points 55 are preferably utilized. The points 55 are operated in conventional manner by the cam 56 associated with distributor 36. The drive for the cam 56 is indicated schematically at 57. The relationship is such that the points 55 open each time a spark is required by the spark plugs 37–40 in engine 41.

One of the points 55 is grounded, the other being connected to the junction between a resistor 58 and a coupling (or differentiating) capacitor 59. The remaining terminal of resistor 58 is connected through a second resistor 61 to the lead 46, there being a capacitor 62 connected between ground and the junction of resistors 58 and 61. The remaining terminal of capacitor 59 is connected through a diode 63 to the SCR gate 53. A first resistor 64 is connected between ground and the junction between capacitor 59 and diode 63, whereas a second resistor 66 is connected between ground and the lead which extends from diode 63 to gate 53.

The circuitry for effecting triggering, and preventing false triggering, further comprises a diode 67 which is connected from lead 46 to gate 53, and a second diode 68 which is interposed in lead 46 between the positive terminal of battery 11 and the connection between lead 46 and SCR 49. In addition to the above-recited elements, a capacitor 69 is bridged across the primary 33 of the spark transformer or induction coil.

When the contact points 55 are closed as indicated, current from the positive battery terminal flows through resistors 61 and 58 and through points 55 to ground, so that it is prevented from reaching the gate 53. Upon opening of points 55, current flows from the battery via resistors 61 and 58 to coupling capacitor 59 (which is at this time fully discharged). When the postive voltage pulse from battery 11 reaches the left side of capacitor 59, a transient condition will occur by which the positive pulse will be transmitted through capacitor 59 and diode 63 to gate 53, thereby triggering SCR 49 and effecting discharge of spark capacitor 44 as stated heretofore. The SCR will trigger even though the indicated positive pulse is very short in duration, for example only a few microseconds.

As soon as the contact points 55 close again, the coupling capacitor 59 is discharged by means of a circuit which includes points 55, resistor 64, and ground. Thus, resistor 64 performs the function of discharging the capacitor 59 so that it will be ready to transmit a new pulse to gate 53 upon reopening of points 55. The resistor 58 serves as a current limiter, preventing excessive flow of current to ground when points 55 are closed, and also preventing excessive flow of current to gate 53 when the points 55 are open.

As described heretofore, triggering of SCR 49 permits discharge of spark or firing capacitor 44 through a counterclockwise path including the left side of capacitor 44, SCR 49, a portion of lead 46, transformer primary 33, and the right side of capacitor 44. Also as indicated above, there then occurs a restoring or reverse flow of current in a clockwise direction from the right side of capacitor 44 through primary 33, thence upwardly through diode 48 to the left side of capacitor 44. If the initial charge on capacitor 44 is sufficiently strong, such restoring flow of current will cause the voltage across SCR 49 to be reversed, so that the cathode 52 is positive with respect to anode 51, thereby extinguishing the SCR. However, if the charge on capacitor 44 is not sufficiently great, the restoring current flow will not operate to effect extinguishment of SCR 49, since the restoring current flow will be overpowered or dominated by the flow of current from choke 45 through SCR 49. The SCR 49 will then not extinguish, but will instead create a substantially short-circuit condition which will result in blowing of the fuse (not shown) incorporated in the system.

The relationship described above may best be understood with reference to the junction point 71 between the lead from choke 45 to diode 48, and the lead from capacitor 44 to SCR 49. At a given instant in time during conduction of SCR 49, current will be flowing from choke 45 downwardly through such junction 71 and through the SCR to ground (or back to the battery 11), and the above-indicated restoring or reverse current will be flowing from capacitor 44 upwardly through diode 48 and junction 71 back to capacitor 44. If, therefore, the restorative or reverse current from capacitor 44 is greater than the current from choke 45, there will be no net downward current through the SCR 49 and the latter will no longer be in conduction. If, on the other hand, the downward current from choke 45 through junction 71 is greater than the upward current through diode 48, there will be a net downward current through SCR 49 which will then remain in conduction.

In view of the above, it is highly important to the invention that the SCR 49 be prevented from being triggered, and initiating the discharge of capacitor 44, until such capacitor 44 is sufficiently charged from power supply 10 that the reverse or restoring current will have a magnitude sufficient to effect extinguishment of the SCR.

According to the embodiment of FIGURE 1, the charging current for the firing or spark capacitor 44 is employed to create a voltage condition which prevents SCR 49 from firing until capacitor 44 is charged. Circuit elements for accomplishing this result include the resistor 47 which is connected between lead 46 and ground, and the portion of lead 46 (including diode 68) which extends between the upper terminal of resistor 47 and the left terminal of resistor 61. Additional circuit elements for maintaining the indicated voltage condition include the diode 67 and resistor 66.

As previously indicated, during charging of capacitor 44 from power supply 10, the charging current flows downwardly through primary 33 to lead 46, thence through resistor 47 to ground, and/or through diode 68 back to the battery. A portion of the charging current also flows to ground through diode 67 and resistor 66.

While current is flowing through diode 68 to the battery, the circuit point or junction 72 (between lead 46 and resistor 47) must be at a voltage which is greater than battery voltage. On the other hand, any triggering signal delivered to gate 53 must be at a voltage less than battery voltage since such triggering signal is derived from the battery via resistors 61 and 58 (which result in voltage drop), capacitor 59 and diode 63. It follows that so long as current is flowing from junction 72 to the battery, the voltage of the SCR cathode 52 must be greater than any voltage delivered to gate 53. The gate voltage is thus negative, and the SCR will not be triggered.

The operation described in the previous paragraph is such that the SCR 49 will not be triggered (during charging of capacitor 44) even though a trigger signal reaches gate 53. There will next be described a voltage relationship which effects open circuiting of a lead to the gate during charging of the capacitor 44. It follows that there are two reasons why the SCR cannot be triggered during capacitor charging: (a) the SCR is reverse biased, and (b) the connection to the gate is effectively open circuited.

As noted above, junction 72 is at a voltage above battery voltage during charging of capacitor 44. The gate 53 is therefore at a voltage which is approximately battery voltage, since the drop across diode 67 is subtracted from the voltage at point 72. However, as previously stated, the voltage at the anode of diode 63 is necessarily at a voltage less than than battery voltage, there being a voltage drop across elements 61, 58 and 59. Accordingly, diode 63 is reverse biased, and open circuits the connection to gate 53.

The various circuit values (including the values of resistors 47 and 66) are so selected that the above-stated voltage and current relationships continue during charging of the capacitor 44. Stated otherwise, current flow continues through diodes 68 and 67 while capacitor 44 is being charged. When capacitor 44 becomes charged, there is no longer any flow of capacitor-charging current through diodes 67 and 68, etc. The voltages at junction 72 and at gate 53 then reduce due to current flow to ground through resistors 47 and 66, so that the SCR and diode 63 are no longer reverse biased. The SCR may therefore be triggered in response to a legitimate voltage pulse. It is to be noted that resistor 66 is much higher in value than resistor 47.

The capacitor 69, which is bridged across transformer primary 33, also aids in preventing undesired triggering of the SCR 49. As previously emphasized, initial triggering of the SCR effects counterclockwise current flow through capacitor 44, followed by a restorative current flow in a clockwise direction through diode 48. Upon completion of such restorative current flow, the capacitor 44 will again tend to discharge in a counterclockwise direction but such discharge will be blocked by the diode 48 and by the now non-conducting SCR 49. It follows that there will then occur a rapid voltage rise across the parallel combination of the SCR 49, diode 48, capacitor 69 and transformer primary 33. If this voltage rise is sufficiently rapid, the SCR will again trigger, in the absence of any triggering signal at gate 53. However, because of the presence of capacitor 69, the indicated voltage rise is caused to be sufficiently slow that this type of false triggering of the SCR 49 will be prevented.

The resistor 61 and capacitor 62 also aid in preventing false triggering of SCR 49, such elements constituting a low-pass filter. The time constant of the filter should be sufficiently long, for example fifty to one hundred microseconds, that the harmful effects of transients present in the circuit are greatly reduced or eliminated. It will be understood that such transients may result from various conditions present in the automobile ignition system, for example due to operation of the voltage regulator, due to the turning on of the lights of the automobile, etc.

The various circuit elements including diode 68, resistor 47, diode 67, etc., are highly important, despite the presence of the low-pass filter formed by elements 61–62, since they prevent false triggering of the SCR 49 due to factors such as contact bounce at the points 55. It is emphasized that the breaker points 55, after opening, may make a resonant movement and close again—much like the bouncing of a ball at an extremely rapid rate. Such rate of movement may be, for example, three thousand times per second. Such rapid consecutive closing of the points 55 would, in the absence of the protective circuitry described herein, cause the SCR 49 to be repetitively triggered, permitting the current through the charging choke 45 to build up excessively. Finally, the SCR could not be extinguished because all of the energy from capacitor 44 would be dissipated before the previously-indicated restoring or reverse capacitor current could effect extinguishment of the SCR. The SCR would therefore remain in conduction and would become a short circuit.

In summary, therefore, the low-pass filter 61–62 aids in preventing false triggering of SCR 49 due to transients in the circuitry, whereas the various protective elements including diodes 67 and 68, and resistors 47 and 66, prevent false triggering of the SCR due to factors including contact bounce. Capacitor 69 prevents false triggering in response to an excessively rapid rise rate in the voltage across the SCR.

Diode 67 also functions to prevent the SCR from exceeding its negative voltage rating. Stated otherwise, the diode 67 limits the negative voltage which may be applied between the cathode and gate of the SCR to a value which is below the negative voltage rating thereof.

*Embodiment of FIGURE 2*

In the previous embodiment, the false trigger signals to gate 53 were either rendered ineffective, or were blocked. FIGURES 2 and 3 show circuitry for passing such signals to ground.

FIGURE 2 illustrates a first form of circuit by which false trigger signals are shunted to ground before they reach the gate 53 of SCR 49. Such shunting occurs through an additional transistor 75 having a base 76, emitter 77 and collector 78. Contrary to the switching transistor 19, which is illustrated to be of the PNP type, such transistor 75 is of the NPN type.

Elements in the circuit of FIGURE 2 which correspond to those in the circuit of FIGURE 1 have been correspondingly numbered. It is to be understood that the power supply 10 represented schematically in FIGURE 2 is identical to the one shown in FIGURE 1. It is pointed out that the portion of lead 46 (FIGURE 1) which includes diode 68 is omitted in the circuit of FIGURE 2, the common lead from elements 48, 49, 69 and 33 being connected directly to ground through a lead 80.

The lead which extends from the junction between resistor 58 and capacitor 59 is connected not only to the points 55, but also through a resistor 81 to transistor base 76. The junction between resistor 81 and base 76 is connected through a capacitor 82 to ground. The remaining terminal of capacitor 59 is connected through a resistor 83 to gate 53, the diode 63 and resistors 64 and 66 of the previous embodiment being omitted.

The junction between resistor 83 and gate 53 is connected to collector 78, whereas emitter 77 is connected to ground. A diode 84 is connected between the cathode and gate of the SCR 49, being so directed that current may flow in a direction toward resistor 83.

In the operation of the circuit of FIGURE 2, the spark capacitor 44 is charged from power supply 10 by charging current which flows downwardly through primary 33 to lead 80 and thence to ground. The various components of the charging circuit are so proportioned that the time required for complete charging of capacitor 44 is less than the minimum time during which breaker points 55 remain closed. It is therefore assured that capacitor 44 will be sufficiently charged to result in extinguishment of SCR 49, as described in detail above, after opening of the points 55.

Upon opening of the points 55, current will flow from the positive battery terminal through the low-pass filter 61–62 and through a current-limiting resistor 58 to resistor 81. From resistor 81, the current flows through transistor base 76 and emitter 77 to ground. The transistor is thus driven into saturation, so that any false trigger signal which reaches the junction between resistor 83 and gate 53 will be passed through the transistor to ground. Accordingly, the SCR will not be triggered.

Upon reclosing of the breaker points 55, the current which previously flowed to the transistor base 76 is bled to ground, thereby cutting off the transistor so that it is no longer operative to pass false trigger signals to ground. However, any false trigger signals are at this time passed through the points 55 to ground.

Upon subsequent reopening of the points 55, the transistor 75 is again placed into conduction and will bypass any false trigger signals to ground.

The only time during which an effective trigger signal may reach the gate 53 is during the minute period, immediately subsequent to opening of points 55, during which the transistor 75 is driven into saturation. This time period is caused, by the resistor 81 and capacitor 82 which form a time-delay network, to be sufficiently great that a legitimate trigger signal will pass through the coupling capacitor 59 and resistor 83 to gate 53 immediately upon opening of the points 55.

The network 81-82 also maintains transistor 75 in conduction during momentary closing and opening of contacts 55, due to contact bounce. It follows that a trigger signal will only be operative after a legitimate contact opening caused by cam 56.

The resistor 83 performs the function of permitting shorting of the transistor 75 without effecting collapse of the current flow to the transistor base 76. The diode 84 performs the function of permitting the coupling capacitor 59 to discharge subsequent to transmission of a trigger pulse to gate 53. In the circuit of FIGURE 1 such discharge was effected through resistor 64. In the present circuit, the discharge path is through points 55, ground, diode 84 and resistor 83.

*Embodiment of FIGURE 3*

FIGURE 3 illustrates an embodiment wherein prevention of false triggering is effected in direct response to variation in the voltage across the charging choke 45. The circuit of FIGURE 3 corresponds to the circuit of FIGURE 2 except as will be specifically described.

In the circuit of FIGURE 3, a transistor 86 is provided, having a base 87, emitter 88 and collector 89. The illustrated transistor is of the PNP type.

A circuit point 91 between power supply 10 and choke 45 is connected through a capacitor 92 and resistor 93 to the transistor base 87. The collector of the transistor is connected to ground, whereas the emitter of the transistor is directly connected to coupling capacitor 59. Emitter 88 is also connected through a diode 95 to gate 53. A second diode, numbered 94, is connected between ground and the junction between capacitor 92 and resistor 93.

In the operation of the circuit of FIGURE 3, it is pointed out that the voltage at point 91 varies between the power supply voltage (for example, one hundred fifty volts) and the voltage of capacitor 44 (for example, approaching three hundred volts). Upon initiation of charging of the capacitor 44, the voltage at point 91 will be approximately one hundred fifty volts (or other power supply of voltage). On the other hand, when the charging cycle is completed there will be no current flow through the choke 45, so that the voltage at point 91 will be the same as that at capacitor 44 (approaching three hundred volts, for example).

Capacitor 92 charges to full value (such as approaching three hundred volts) when point 91 is at maximum voltage, the charging current passing through diode 94 to ground. The charging current also flows downwardly through resistor 93 to base 87, collector 89 and ground, maintaining the transistor in cut-off condition. The upper terminal of the capacitor 92 is positive.

When the voltage at point 91 reduces, for example to one hundred fifty volts, the voltage at point 91 will be less than that to which capacitor 92 is charged. The only current which can flow during the resulting discharge of capacitor 92 must come through emitter 89, base 87 and resistor 93, since diodes 94 and 95 prevent any other current from flowing into the negative side of the capacitor. The resulting negative current flow through transistor 86 maintains the same in conduction.

In summary, therefore, transistor 86 is in conduction during charging of capacitor 44 (low voltage at point 91), but is cut off subsequent to completion of such charging (high voltage at point 91). It follows that any trigger signal passing from the battery terminal through resistors 61 and 58, and capacitor 59, toward diode 93 and gate 53, during charging of capacitor 44, will instead be bypassed through transistor emitter 88 and collector 89 to ground. Accordingly, triggering of the SCR 49 will not be possible until charging of capacitor 44 is completed. Since, as described in detail heretofore, triggering of SCR 49 subsequent to completion of charging of capacitor 44 results in normal operation, and permits the SCR 49 to extinguish, malfunctioning of the system is prevented.

*Specific examples*

The following specific examples are given by way of example only, and do not constitute limitations. All capacitances are given in microfarads, and all resistances in ohms. The inductance of the choke 45 is 0.1 henry.

| COMPONENT | Value |
|---|---|
| Resistors: | |
| 28 | 33,000 |
| 47 | 100 |
| 58 | 100 |
| 61 | 10 |
| 64 | 10,000 |
| 66 | 5,000 |
| 81 | 1,000 |
| 83 | 50 |
| 93 | 50,000 |
| Capacitors: | |
| 14 | 0.50 |
| 15 | 0.05 |
| 27 | 0.05 |
| 29 | 60.00 |
| 44 | 2.00 |
| 59 | 0.02 |
| 62 | 20.00 |
| 69 | 0.01 |
| 82 | 0.002 |
| 92 | 0.10 |

The foregoing detailed description is to be clearly understood as given by way of illustration and example only, the spirit and scope of this invention being limited solely by the appended claims.

I claim:

1. An ignition system for internal combustion engines, which comprises power-supply means adapted when connected to a battery to deliver a positive output voltage much greater than battery voltage, a step-up transformer, a spark capacitor having one terminal thereof connected to the positive output of said power-supply means and the other terminal thereof connected to one terminal of the primary of said transformer, a diode having the anode thereof connected to the other terminal of said transformer primary and the cathode thereof connected to said one terminal of said capacitor, an SCR connected in shunt with said diode, the anode of said SCR being connected to said power-supply output and the cathode thereof being connected to said other terminal of said transformer primary, means to connect the secondary of said transformer to the spark plug means of said engine, triggering means connected to the gate of said SCR to trigger said SCR at predetermined times when it is necessary that a spark be generated in said spark plug means, said triggering means being connected directly to said battery whereby the voltage at said gate may not exceed battery voltage, said SCR operating when triggered to discharge said capacitor through said transformer primary and thereby effect generation of a spark in said spark plug means, and means additional to said triggering means to prevent triggering of said SCR at times other than said predetermined times, said last-named means comprising means to maintain said SCR in reverse-biased condition at all times except when said capacitor is sufficiently charged to effect extinguishment of said SCR during the reverse or restorative flow of current from said capacitor through said diode after the initial discharge of said capacitor through said SCR, said means for maintaining said SCR in reverse-biased condition comprising circuit means including a resistor to connect to ground said cathode of said SCR, and circuit means including an additional diode to connect said SCR cathode to the positive terminal of said battery, said additional diode being so oriented that current may only flow therethrough in a direction toward said positive battery terminal, whereby the charging current from said power-supply means to said capacitor will flow also through said additional diode and thereby maintain said cathode at a potential higher than that of said gate until charging of said capacitor is substantially complete.

2. An ignition system for internal combustion engines, which comprises power-supply means adapted when connected to a battery to deliver an output voltage much greater than battery voltage, a step-up transformer, a spark capacitor having one terminal thereof connected to the output of said power-supply means and the other terminal thereof connected to one terminal of the primary of said transformer, a diode connected between the other terminal of said transformer primary and said one terminal of said capacitor, an SCR connected in shunt with said diode, said SCR being so arranged that upon triggering thereof current will flow therethrough in a direction which is the reverse of the direction of current flow through said diode, means to connect the secondary of said transformer to the spark plug means of said engine, triggering means to trigger said SCR at predetermined times when it is necessary that a spark be generated in said spark plug means, said SCR operating when triggered to discharge said capacitor through said transformer primary and thereby effect generation of a spark in said spark plug means, and means additional to said triggering means to prevent triggering of said SCR at times other than said predetermined times, said last-named means comprising a second diode connected in circuit between said triggering means and the gate of said SCR, and means to maintain said second diode in reverse-biased condition during charging of said capacitor, whereby an open circuit is maintained to said gate during charging of said capacitor.

References Cited by the Examiner

UNITED STATES PATENTS

| | | | |
|---|---|---|---|
| 2,980,093 | 4/1961 | Short | 123—148 |
| 2,980,822 | 4/1961 | Short | 315—180 |
| 3,032,685 | 5/1962 | Loomis | 315—183 |
| 3,049,642 | 8/1962 | Quinn | 315—206 |
| 3,184,653 | 5/1965 | Hutson | 317—157.62 |

JAMES W. LAWRENCE, *Primary Examiner.*

C. R. CAMPBELL, *Assistant Examiner.*